Figure 4:
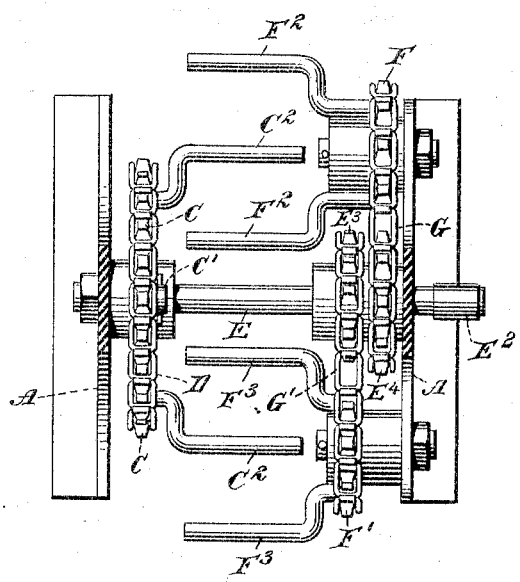

No. 777,163. PATENTED DEC. 13, 1904.
J. H. VOLKMANN.
MACHINE FOR WORKING VISCOUS SUBSTANCES.
APPLICATION FILED DEC. 31, 1903.
NO MODEL. 2 SHEETS—SHEET 1.
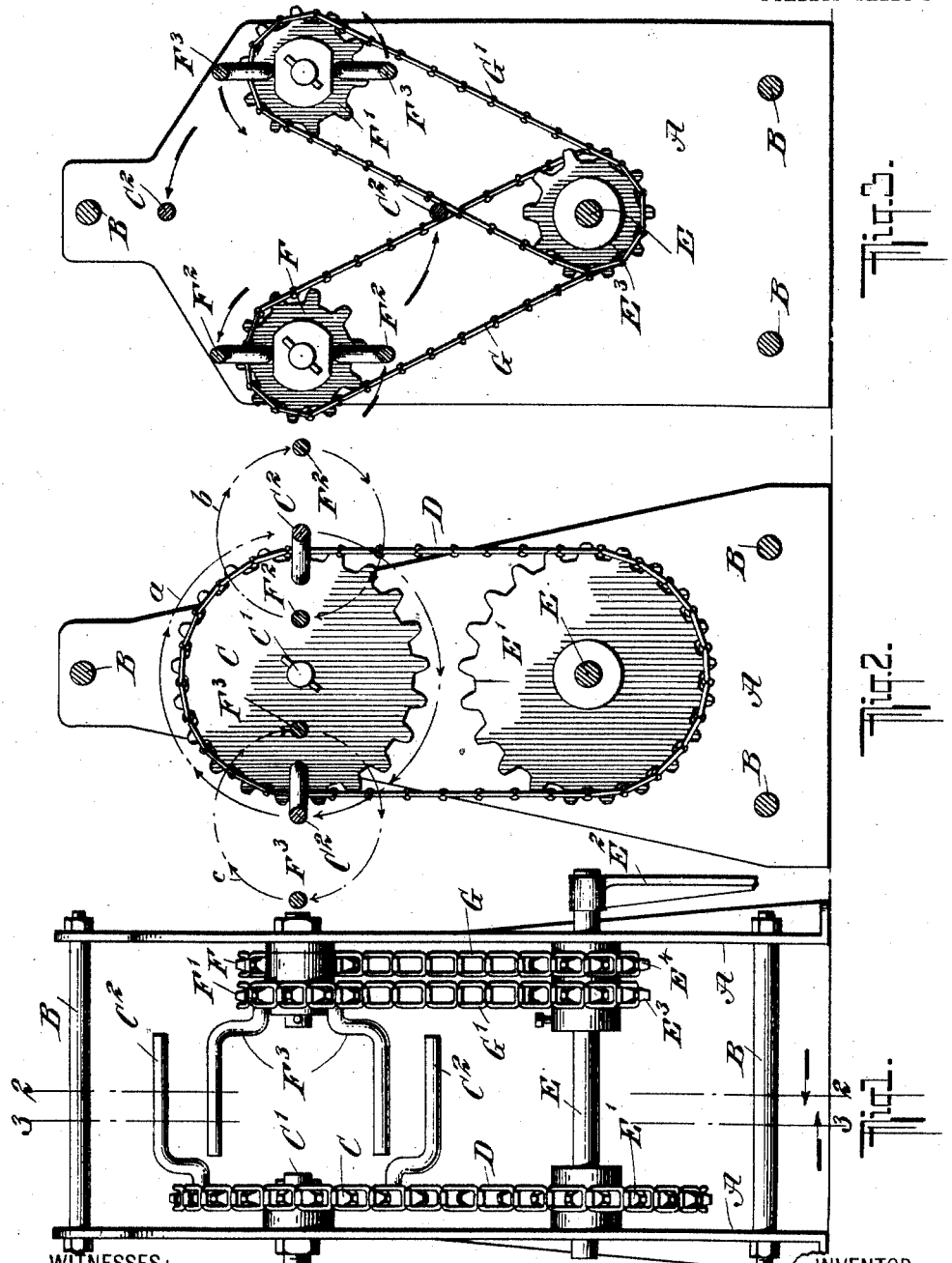
WITNESSES:
INVENTOR
John H. Volkmann
BY
ATTORNEYS No. 777,163. PATENTED DEC. 13, 1904.
J. H. VOLKMANN.
MACHINE FOR WORKING VISCOUS SUBSTANCES.
APPLICATION FILED DEC. 31, 1903.
NO MODEL. 2 SHEETS—SHEET 2.

WITNESSES:
John A. Kehlenbeck
John Lotka

INVENTOR
John H. Volkmann
BY
Briesen Knauth
ATTORNEYS

No. 777,163. Patented December 13, 1904.

UNITED STATES PATENT OFFICE.

JOHN H. VOLKMANN, OF NEW YORK, N. Y.

MACHINE FOR WORKING VISCOUS SUBSTANCES.

SPECIFICATION forming part of Letters Patent No. 777,163, dated December 13, 1904.

Application filed December 31, 1903. Serial No. 187,255. (No model.)

*To all whom it may concern:*

Be it known that I, JOHN H. VOLKMANN, a subject of the Emperor of Germany, and a resident of the borough of Manhattan, city, county, and State of New York, have invented a Machine for Working Viscous Substances, of which the following is a specification.

My invention relates to machines for working viscous substances, and more especially the sticky mass or batch from which candy is made.

The object of my invention is to produce a very efficient stretching action, so that the mass may be thoroughly worked in a much shorter time than has been possible hitherto.

To this end my invention consists in certain combinations of parts, that will be fully described hereinafter and particularly pointed out in the appended claims.

Reference is to be had to the accompanying drawings, in which—

Figure 1 is a side elevation of my improved machine. Figs. 2 and 3 are sectional elevations thereof on lines 2 2 and 3 3, respectively, of Fig. 1; and Fig. 4 is a plan view of my improved machine.

The machine comprises a suitable frame consisting, for instance, of parallel upright plates A and bolts B, connecting them. On this frame is journaled to turn about an axis $C'$ a member C, preferably in the nature of a toothed disk or wheel, so that motion may be imparted to it by gearing or by a chain D engaging a sprocket-wheel $E'$ on a shaft E, provided with a crank or handle $E^2$. The member C, to which a rotary or an oscillating motion may be imparted by turning the crank $E^2$, is provided with projections or fingers $C^2$, which are adapted to serve as supports or holders for the candy batch. On the other side of the machine, and preferably at equal distances from the axis $C'$, are mounted loosely two members F F', which may be in the nature of sprocket-wheels connected by chains G G' with sprocket-wheels $E^4$ $E^3$ on the shaft E. The connection is such as to cause the members C, F, and F' to rotate in the same direction. Each of the members F F' carries holders or fingers $F^2$ $F^3$, projecting therefrom toward the member C, the length of the fingers $C^2$ $F^2$ $F^3$ being shorter than the distance which separates the members C F F'. When the shaft E is rotated, the projections or fingers $C^2$ will describe a circular path as indicated at $a$ in Fig. 2, while the fingers $F^2$ $F^3$ will describe circular paths indicated by the lines $b$ $c$. It will be seen that the paths $b$ $c$ do not intersect, but each of them intersects the path $a$, which is of larger diameter than at least one of the paths $b$ $c$ and preferably of larger diameter than each of them. If now a mass or batch of candy or similar viscous substance is placed on the fingers or holders $C^2$ $F^2$ $F^3$, the motion of the said fingers in the path indicated in Fig. 2 will cause the said mass to be stretched in every portion of its extent, and this stretching action will be very considerable. As the entire mass is continuously subjected to a stretching action, a satisfactory result is obtained in a much shorter time than has been possible with constructions employed hitherto.

While I have shown only two members F F' working in conjunction with the main member or master member C, I desire it to be understood that a greater number of such members may be provided. I might also use only one of the members F F' in conjunction with the master member C, the difference in the diameters of the paths $a$ and $b$ or $c$ producing a continuous pull or stretch on the material.

What I claim, and desire to secure by Letters Patent, is—

1. A machine for working viscous substances, comprising three or more members mounted to completely revolve about different parallel axes and provided with fingers or projections adapted to hold the material, the path of the projections on one member being of greater diameter than, and intersecting the path of, the projections on another member.

2. A machine for working viscous substances, comprising a centrally-located master member mounted to turn and provided with projections or fingers adapted to carry the material, and a plurality of peripherally-located auxiliary members mounted to turn and provided with projections, the paths of which intersect the path of the projections of the master member, but do not intersect each other, both the auxiliary and the master members having a complete revolution so that each of the projections on said members describes a complete circle.

3. A machine for working viscous substances, comprising a master member mounted to turn and provided with projections adapted to carry the material, and a plurality of auxiliary members mounted to turn, and likewise provided with projections, the paths of which are of smaller diameter than the path of the projections on the master member and intersect said path, both the auxiliary and the master members having a complete revolution so that each of the projections on said members describes a complete circle.

4. A machine for working viscous substances, comprising a master member mounted to turn and provided with projections for carrying the material, and a plurality of auxiliary members mounted to turn about axes different from that of the master member but parallel therewith and provided with projections, the paths of which intersect that of the projections on the master member, one, at least, of the paths of the said auxiliary-member projections being of smaller diameter than the path of the master-member projections, both the auxiliary and the master members having a complete revolution so that each of the projections on said members describes a complete circle.

5. A machine for working viscous substances, comprising a master member mounted to turn and provided with projections adapted to carry the material, a plurality of auxiliary members mounted to turn and provided with projections, the paths of which intersect that of the projections on the master member, and means for simultaneously turning all of the said members in the same direction, both the auxiliary and the master members having a complete revolution so that each of the projections on said members describes a complete circle.

In testimony whereof I have signed my name to this specification in the presence of two subscribing witnesses.

JOHN H. VOLKMANN.

Witnesses:
  AUG. MERCKENS,
  EUGENE EBLE.